United States Patent
Liang et al.

(10) Patent No.: US 12,556,290 B2
(45) Date of Patent: Feb. 17, 2026

(54) AMPLITUDE AND PHASE CALIBRATION METHOD AND DEVICE, STORAGE MEDIUM, AND ELECTRONIC DEVICE

(71) Applicant: SANECHIPS TECHNOLOGY CO., LTD., Guangdong (CN)

(72) Inventors: Guodong Liang, Guangdong (CN); Xiaoliang Gong, Guangdong (CN); Anwen Hu, Guangdong (CN); Yan Guo, Guangdong (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 320 days.

(21) Appl. No.: 18/267,817

(22) PCT Filed: Nov. 23, 2021

(86) PCT No.: PCT/CN2021/132529
§ 371 (c)(1),
(2) Date: Jun. 16, 2023

(87) PCT Pub. No.: WO2022/127534
PCT Pub. Date: Jun. 23, 2022

(65) Prior Publication Data
US 2024/0121016 A1 Apr. 11, 2024

(30) Foreign Application Priority Data
Dec. 16, 2020 (CN) .......................... 202011493913.3

(51) Int. Cl.
*H04B 17/12* (2015.01)
*H04B 17/21* (2015.01)

(52) U.S. Cl.
CPC ............. *H04B 17/12* (2015.01); *H04B 17/21* (2015.01)

(58) Field of Classification Search
CPC ................................. H04B 17/12; H04B 17/21
See application file for complete search history.

(56) References Cited

U.S. PATENT DOCUMENTS

| | | | | |
|---|---|---|---|---|
| 5,886,573 A | * | 3/1999 | Kolanek | H03F 1/3252 330/10 |
| 6,198,781 B1 | * | 3/2001 | Ohno | H04L 27/26524 375/322 |

(Continued)

FOREIGN PATENT DOCUMENTS

| | | |
|---|---|---|
| CN | 104158601 A | 11/2014 |
| CN | 110031809 A | 7/2019 |

(Continued)

OTHER PUBLICATIONS

China Patent Office, first Office action dated Jan. 8, 2025, for corresponding CN application No. 2020114939133.

(Continued)

*Primary Examiner* — Dominic E Rego
(74) *Attorney, Agent, or Firm* — Li & Cai Intellectual Property (USA) Office

(57) ABSTRACT

Embodiments of the present disclosure provide an amplitude and phase calibration method and device, a storage medium, and an electronic device. The method includes: receiving a plurality of signals to be calibrated, with the plurality of signals to be calibrated being signals of one or more digital channels; routing the plurality of signals to be calibrated to a plurality of basic units, with each of the basic units configured to process one of the signals to be calibrated; and performing amplitude and phase calibration on the plurality of signals to be calibrated by the plurality of basic units. The present disclosure can solve the problems in the related technology that related solutions merely support single-channel broadband amplitude-phase tracking or merely support narrow-band amplitude-phase tracking, are difficult to (Continued)

expand once demands are fixed, and have relatively poor universality, flexibly select data input into a basic computing unit, realize flexible configuration according to different demands, and improve universality and expandability of system.

14 Claims, 4 Drawing Sheets

(56) References Cited

U.S. PATENT DOCUMENTS

| | | | | |
|---|---|---|---|---|
| 6,236,839 | B1* | 5/2001 | Gu | H01Q 3/267 |
| | | | | 342/359 |
| 10,972,195 | B1* | 4/2021 | Yao | H01Q 1/288 |
| 2001/0005685 | A1* | 6/2001 | Nishimori | H01Q 3/2605 |
| | | | | 455/562.1 |
| 2004/0001559 | A1 | 1/2004 | Pinckley et al. | |
| 2004/0085929 | A1 | 5/2004 | Azuma | |
| 2006/0111050 | A1* | 5/2006 | Choi | H01Q 3/267 |
| | | | | 455/67.11 |
| 2007/0037519 | A1* | 2/2007 | Kim | H04B 17/21 |
| | | | | 455/562.1 |
| 2008/0051080 | A1* | 2/2008 | Walker | H04B 7/2041 |
| | | | | 455/427 |
| 2011/0006949 | A1 | 1/2011 | Webb | |
| 2011/0204934 | A1* | 8/2011 | Schmidt | H01Q 3/267 |
| | | | | 327/155 |
| 2016/0164382 | A1* | 6/2016 | Moura | H01L 21/68707 |
| | | | | 310/68 B |
| 2016/0337052 | A1* | 11/2016 | Wen | H04B 10/2575 |
| 2017/0038459 | A1* | 2/2017 | Kubacki | G01S 17/36 |
| 2017/0153324 | A1* | 6/2017 | Lomnitz | H04B 17/12 |
| 2017/0163327 | A1* | 6/2017 | Yang | H04B 7/0413 |
| 2018/0059218 | A1* | 3/2018 | Buettgen | G01S 7/497 |
| 2018/0123707 | A1* | 5/2018 | Morishige | H04B 17/12 |
| 2018/0159637 | A1 | 6/2018 | Taher et al. | |
| 2019/0044568 | A1* | 2/2019 | Yamaguchi | H04B 7/0691 |
| 2020/0112096 | A1* | 4/2020 | Mochizuki | H04B 1/0483 |
| 2020/0136706 | A1* | 4/2020 | Lv | H03F 1/32 |
| 2021/0409128 | A1* | 12/2021 | Raghavan | H04B 7/0452 |

FOREIGN PATENT DOCUMENTS

| | | |
|---|---|---|
| CN | 110824466 A | 2/2020 |
| CN | 111342911 A | 6/2020 |
| CN | 212086494 U | 12/2020 |
| JP | 2004153496 A | 5/2004 |
| JP | 2004356942 A | 12/2004 |
| WO | WO 2013118367 A1 | 8/2013 |

OTHER PUBLICATIONS

Japan Patent Office, JP2023-536146 Decision of Rejection issued on Jun. 25, 2024.
WIPO, International Search Report issued on Feb. 10, 2022.
China Patent Office, second Office action dated Jun. 5, 2025, for corresponding CN application No. 2020114939133.
European Patent Office, the extended European Search Report dated Sep. 19, 2024, for corresponding EP application No. 21905463.2.
Japan Patent Office, Decision to Grant a Patent dated Oct. 29, 2024, for corresponding JP application No. 2023-536146.

* cited by examiner

AMPLITUDE AND PHASE CALIBRATION METHOD AND DEVICE, STORAGE MEDIUM, AND ELECTRONIC DEVICE

TECHNICAL FIELD

Embodiments of the present disclosure relate to the technical field of communications, and in particular, to an amplitude and phase calibration method and device, a storage medium, and an electronic device.

BACKGROUND

The amplitude-phase tracking technology is widely applied in the field of wireless communication. For example, in array antenna engineering, in order to ensure that a beam can be successfully synthesized during transmission or reception, a multi-beam antenna system often needs to be corrected to ensure consistency of amplitude and phase between channels, which is also an important precondition for implementation of the array antenna engineering. Or, in a communication system using the instantaneous broadband technology, for a broadband receiving channel, due to imbalance of various devices, impedance matching and other problems, the whole channel itself generates certain fluctuation in amplitude and phase, which worsens signal quality. Therefore, the fluctuation in amplitude and phase caused by the receiving channel also needs to be calibrated in practical applications.

In the related technology, two kinds of solutions are generally adopted: one is that an amplitude-phase tracking device is built by analog devices to eliminate the fluctuation or the inconsistency of the amplitude and the phase, which proposes relatively high requirements on the used analog devices; and the other is to use a digital circuit to eliminate the fluctuation or the inconsistency of the amplitude and the phase. Compared with the solutions using the analog devices, the solutions using the digital circuit are more convenient and simpler to implement. Most of the related solutions using the digital circuit are dedicated to a special scene, some merely support single-channel broadband amplitude-phase tracking, while some merely support narrow-band amplitude-phase tracking. Once the demands are fixed, the related solutions using the digital circuit are difficult to expand upwards or downwards, thus having relatively poor universality and expandability.

No solution has been provided for the problems in the related technology that the related solutions merely support the single-channel broadband amplitude-phase tracking or merely support the narrow-band amplitude-phase tracking, are difficult to expand once the demands are fixed, and have the relatively poor universality and expandability.

SUMMARY

The embodiments of the present disclosure provide an amplitude and phase calibration method and device, a storage medium, and an electronic device, so as to at least solve the problems in the related technology that the related solutions merely support the single-channel broadband amplitude-phase tracking or merely support the narrow-band amplitude-phase tracking, are difficult to expand once the demands are fixed, and have the relatively poor universality and expandability.

According to an embodiment of the present disclosure, an amplitude and phase calibration method is provided and includes: receiving a plurality of signals to be calibrated, with the plurality of signals to be calibrated being signals of one or more digital channels; routing the plurality of signals to be calibrated to a plurality of basic units, with each of the basic units configured to process one of the signals to be calibrated; and performing amplitude and phase calibration on the plurality of signals to be calibrated by the plurality of basic units.

In an embodiment, performing the amplitude and phase calibration on the plurality of signals to be calibrated by the plurality of basic units includes: for each of the plurality of basic units, performing the amplitude and phase calibration on the one of the signals to be calibrated according to a reference signal.

In an embodiment, performing the amplitude and phase calibration on the one of the signals to be calibrated according to the reference signal includes: processing the one of the signals to be calibrated and the reference signal to obtain a first signal; processing the one of the signals to be calibrated to obtain a second signal; determining an amplitude-phase tracking factor according to the first signal and the second signal; and performing the amplitude and phase calibration on the one of the signals to be calibrated according to the amplitude-phase tracking factor.

In an embodiment, processing the one of the signals to be calibrated and the reference signal to obtain the first signal includes: performing complex multiplication on the one of the signals to be calibrated and the reference signal, and performing accumulation and averaging to obtain the first signal.

In an embodiment, processing the one of the signals to be calibrated to obtain the second signal includes: squaring the one of the signals to be calibrated, and performing accumulation and averaging to obtain the second signal.

In an embodiment, determining the amplitude-phase tracking factor according to the first signal and the second signal includes: determining a ratio of the first signal to the second signal as the amplitude-phase tracking factor.

In an embodiment, performing the amplitude and phase calibration on the one of the signals to be calibrated according to the amplitude-phase tracking factor includes: performing complex multiplication on the one of the signals to be calibrated and the amplitude-phase tracking factor to obtain a calibrated signal.

According to another embodiment of the present disclosure, an amplitude and phase calibration device is provided and includes: a data selection module and a plurality of basic units, and the data selection module is configured to receive a plurality of signals to be calibrated, and route the plurality of signals to be calibrated to the plurality of basic units, with the plurality of signals to be calibrated being signals of one or more digital channels; and the plurality of basic units are configured to perform amplitude and phase calibration on the plurality of signals to be calibrated, with each of the plurality of basic units configured to process one of the signals to be calibrated.

In an embodiment, each of the plurality of basic units is configured to perform the amplitude and phase calibration on the one of the signals to be calibrated according to a reference signal.

In an embodiment, each of the plurality of basic units is further configured to process the one of the signals to be calibrated and the reference signal to obtain a first signal; process the one of the signals to be calibrated to obtain a second signal; determine an amplitude-phase tracking factor according to the first signal and the second signal; and perform the amplitude and phase calibration on the one of the signals to be calibrated according to the amplitude-phase tracking factor.

In an embodiment, each of the plurality of basic units is further configured to perform complex multiplication on the one of the signals to be calibrated and the reference signal, and perform accumulation and averaging to obtain the first signal.

In an embodiment, each of the plurality of basic units is further configured to square the one of the signals to be calibrated, and perform accumulation and averaging to obtain the second signal.

In an embodiment, each of the plurality of basic units is further configured to determine a ratio of the first signal to the second signal as the amplitude-phase tracking factor.

In an embodiment, each of the plurality of basic units is further configured to perform complex multiplication on the one of the signals to be calibrated and the amplitude-phase tracking factor to obtain a calibrated signal.

According to still another embodiment, a computer-readable storage medium is further provided, and the storage medium has a computer program stored therein, and the computer program is configured to perform, when being executed, the operations according to any one of the method embodiments described above.

According to yet another embodiment, an electronic device is further provided and includes a memory having a computer program stored therein, and a processor configured to execute the computer program to perform the operations according to any one of the method embodiments described above.

According to the embodiments of the present disclosure, the plurality of signals to be calibrated, which are the signals of one or more digital channels, are received; the plurality of signals to be calibrated are routed to the plurality of basic units, with each of the basic units configured to process one of the signals to be calibrated; and the amplitude and phase calibration is performed on the plurality of signals to be calibrated by the plurality of basic units. Thus, the problems in the related technology that the related solutions merely support the single-channel broadband amplitude-phase tracking or merely support the narrow-band amplitude-phase tracking, are difficult to expand once the demands are fixed, and have the relatively poor universality and expandability can be solved, data input into a basic computing unit can be flexibly selected, flexible configuration according to different demands can be realized, and universality and expandability of system can be improved.

DETAIL DESCRIPTION OF EMBODIMENTS

The embodiments of the present disclosure will be described in detail below with reference to the accompanying drawings in conjunction with the embodiments.

It should be noted that the terms "first", "second" and the like in the description, claims and drawings of the present disclosure are used for distinguishing between similar objects, but not necessarily for describing a particular order or a chronological order.

Figure 1:
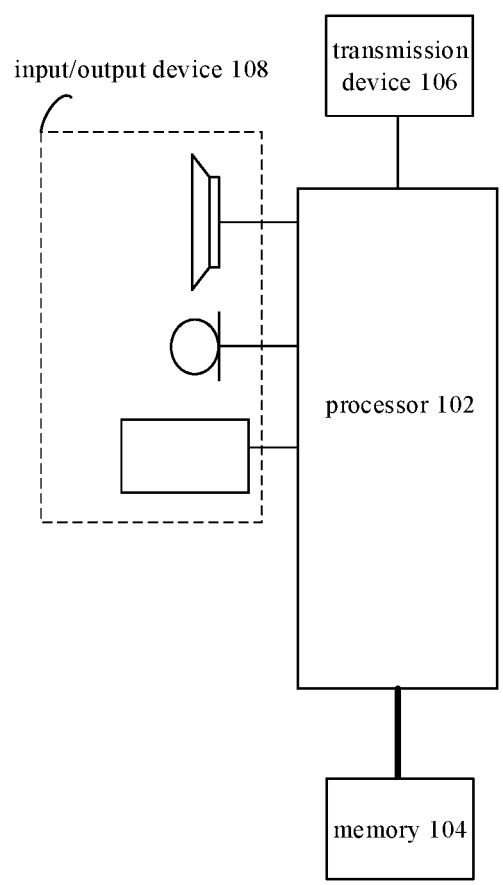
FIG. 1 is a block diagram of a hardware structure of a mobile terminal where an amplitude and phase calibration method is performed according to the present disclosure.

The method provided in the embodiments of the present disclosure may be performed in a mobile terminal, a computer terminal, or a similar computing device. A case where the method is performed in the mobile terminal is taken as an example. FIG. 1 is a block diagram of a hardware structure of a mobile terminal where an amplitude and phase calibration method is performed according to the present disclosure. As shown in FIG. 1, the mobile terminal may include one or more processors 102 (merely one processor is shown in FIG. 1, and the processor 102 may include, but is not limited to, a processing device such as a microprocessor (e.g., a microcontroller unit (MCU)) or a programmable logic device (e.g., a field programmable gate array (FPGA))), and a memory 104 configured to store data. The mobile terminal may further include a transmission device 106 for communication functions and an input/output device 108. It should be understood by those of ordinary skill in the art that the structure shown in FIG. 1 is only for illustration and is not intended to limit the structure of the above mobile terminal. For example, the mobile terminal may include more or fewer components than those shown in FIG. 1, or may be configured in a way different from what is shown in FIG. 1.

The memory 104 may be configured to store computer programs, such as software programs and modules of application software. For example, the memory 104 may be configured to store computer programs corresponding to the amplitude and phase calibration method provided in the present disclosure. By executing the computer programs stored in the memory 104, the processor 102 performs various functional applications and amplitude and phase calibration processing, that is, implementing the above method. The memory 104 may include a high-speed random access memory, and may also include a non-volatile memory, such as one or more magnetic storage devices, flash memories, or other non-volatile solid-state memories. In some examples, the memory 104 may further include a memory remotely arranged relative to the processor 102, and the remote memory may be connected to the mobile terminal via a network. The examples of the network include, but are not limited to, the Internet, an intranet, a local area network, a mobile communication network, and the combinations thereof.

The transmission device 106 is configured to receive or transmit data via a network. The specific examples of the network may include a wireless network provided by a communication provider of the mobile terminal. In an example, the transmission device 106 includes a Network Interface Controller (NIC) that may be connected to other network devices via a base station to communicate with the Internet. In another example, the transmission device 106 may be a Radio Frequency (RF) module that is configured to communicate with the Internet in a wireless manner.

Figure 2:
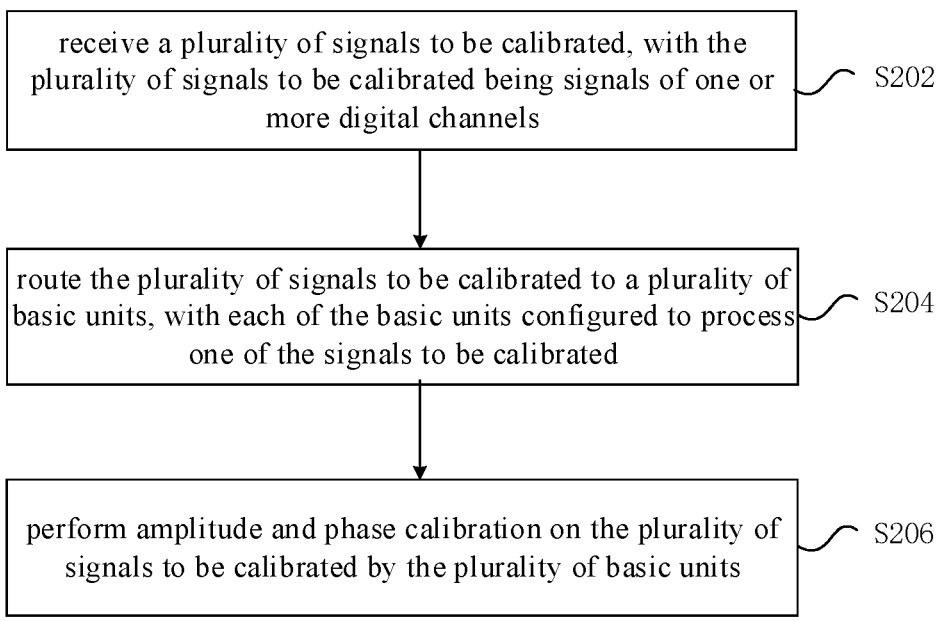
FIG. 2 is a flowchart illustrating an amplitude and phase calibration method according to the present disclosure.

An amplitude and phase calibration method performed in the above mobile terminal or network architecture is provided in an embodiment. FIG. 2 is a flowchart illustrating an amplitude and phase calibration method according to the present disclosure. As shown in FIG. 2, the method includes the following operations S202 to S206.

At operation S202, receiving a plurality of signals to be calibrated, with the plurality of signals to be calibrated being signals of one or more digital channels.

At operation S204, routing the plurality of signals to be calibrated to a plurality of basic units, with each of the basic units configured to process one of the signals to be calibrated.

At operation S206, performing amplitude and phase calibration on the plurality of signals to be calibrated by the plurality of basic units.

Through the operations S202, S204, and S206, the problems in the related technology that the related solutions merely support the single-channel broadband amplitude-phase tracking or merely support the narrow-band amplitude-phase tracking, are difficult to expand once the demands are fixed, and have the relatively poor universality and expandability can be solved, data input into a basic computing unit can be flexibly selected, flexible configuration according to different demands can be realized, and universality and expandability of system can be improved.

In an embodiment, the operation S206 may specifically include: for each of the plurality of basic units, performing the amplitude and phase calibration on the signal to be calibrated according to a reference signal.

In an embodiment, the operation S206 may further include: processing the signal to be calibrated and the reference signal to obtain a first signal, and specifically, performing complex multiplication on the signal to be calibrated and the reference signal, and performing accumulation and averaging to obtain the first signal; processing the signal to be calibrated to obtain a second signal, and specifically, squaring the signal to be calibrated, and performing accumulation and averaging to obtain the second signal; determining an amplitude-phase tracking factor according to the first signal and the second signal, and specifically, determining a ratio of the first signal to the second signal as the amplitude-phase tracking factor; and performing the amplitude and phase calibration on the signal to be calibrated according to the amplitude-phase tracking factor, and specifically, performing complex multiplication on the signal to be calibrated and the amplitude-phase tracking factor to obtain a calibrated signal.

According to the present embodiment, amplitudes and phases of a plurality of digital channels can be calibrated simultaneously with an amplitude and phase calibration apparatus composed of a CPU configuration module, data selection modules, and basic units (BUs). When bandwidths of the signals to be calibrated are diversified in a system, performance and the number of supported channels can be dynamically adjusted under the condition that hardware resources are fixed. Assuming that the maximum performance designed for the system is to simultaneously perform amplitude-phase tracking adjustment on two large-bandwidth signals and each channel is split into four sub-channels, eight basic units are needed to implement such function. Meanwhile, it can also be compatible downwards with four channels split into two sub-channels or amplitude-phase tracking of narrow-band signals of eight single channels. Combination can be carried out freely within the range of the hardware resources, so that compatibility and expandability of the system are greatly improved. A CPU determines a multichannel amplitude-phase tracking mathematical model to be realized; according to the multichannel amplitude-phase tracking mathematical model, the plurality of input signals to be calibrated and the reference signal are selectively routed through the CPU configuration module to be mapped to the respective independent BUs, amplitude-phase tracking calculation is performed according to the input signals to be calibrated and the reference signal to obtain the calibrated signals, and then the calibrated signals are output.

Figure 3:
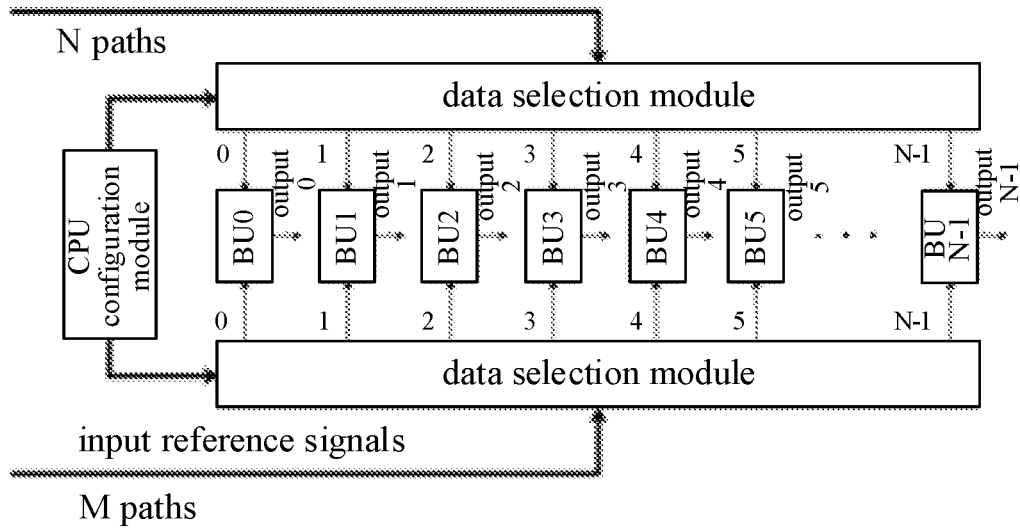
FIG. 3 is a block diagram of a digital multichannel amplitude and phase calibration apparatus according to the present disclosure.

FIG. 3 is a block diagram of a digital multichannel amplitude and phase calibration apparatus according to the present disclosure. As shown in FIG. 3, the apparatus includes two data selection modules, a CPU configuration module, and N BUs.

Figure 4:
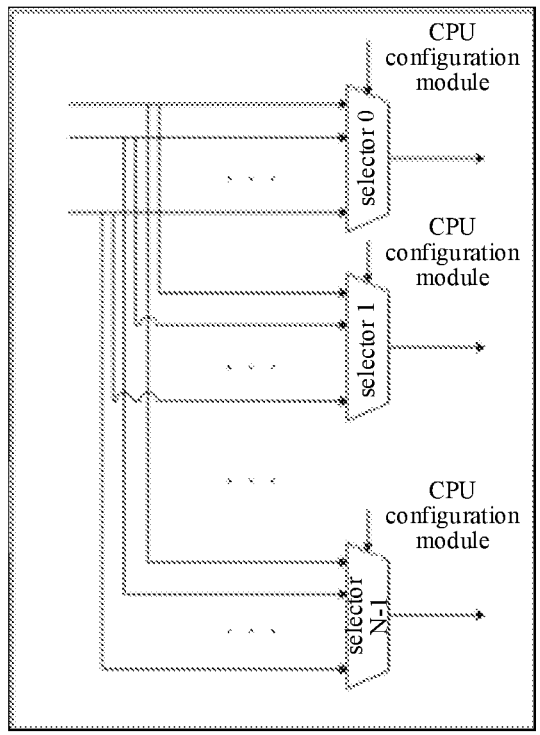
FIG. 4 is a block diagram of a data selection module in a digital multichannel amplitude and phase calibration apparatus according to the present disclosure.

FIG. 4 is a block diagram of a data selection module in a digital multichannel amplitude and phase calibration apparatus according to the present disclosure. As shown in FIG. 4, the CPU configuration module matches the data selection modules according to an arithmetic mathematical model that needs to be supported, input data to be calibrated and a reference signal may be flexibly mapped to the BUs, and then calculation is performed in combination with the BUs, so that the apparatus has a reconfigurable multichannel amplitude-phase tracking design.

Figure 5:
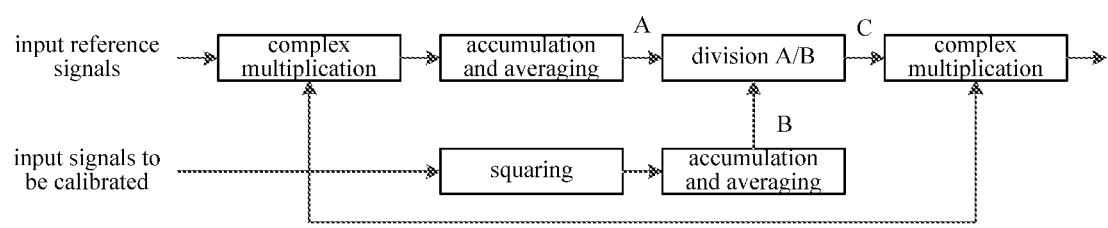
FIG. 5 is a block diagram of a basic unit (BU) in a digital multichannel amplitude and phase calibration apparatus according to the present disclosure.

FIG. 5 is a block diagram of a BU in a digital multichannel amplitude and phase calibration apparatus according to the present disclosure. As shown in FIG. 5, the whole apparatus is provided with N BUs, the number of the BUs is consistent with the number of input channels to be calibrated, and the BUs are numbered from 0 to N−1, the N BUs are consistent in structure, and each BU processes one amplitude-phase tracking operation demand. A calculation formula of the amplitude-phase tracking factor is as follows:

$$\text{phase\_gain} = \frac{\frac{1}{N}\sum_{n=1}^{N} x(n) * y(n)}{\frac{1}{N}\sum_{n=1}^{N} y(n) * y(n)}$$

where x represents the input reference signal, and y represents the input signals to be calibrated. The input signals to be calibrated and the reference signal are input into the BUs, and subjected to complex multiplication, accumulation, and averaging to obtain signal A (corresponding to the first signal). Meanwhile, the signals to be calibrated are squared to obtain single-point power values, accumulation is performed, and mean power is calculated to obtain signal B (corresponding to the second signal). A ratio of the signal A to the signal B, i.e., the signal A/the signal B, is taken as the amplitude-phase tracking factor C, the amplitude-phase tracking factor C and the signals to be calibrated are subjected to complex multiplication, and then the calibrated signal is output.

Figure 6:
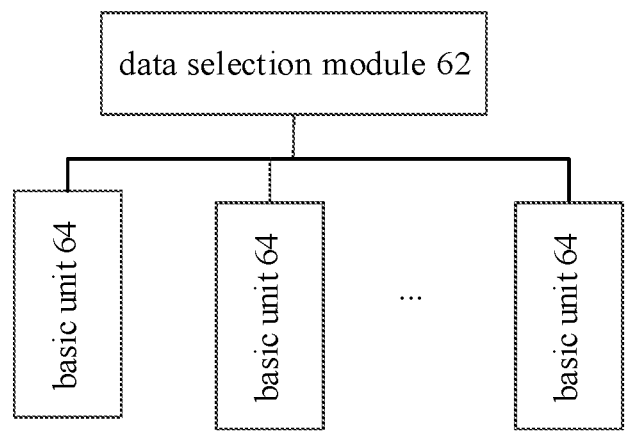
FIG. 6 is a block diagram of an amplitude and phase calibration device according to the present disclosure.

According to another embodiment of the present disclosure, an amplitude and phase calibration device is further provided. FIG. 6 is a block diagram of an amplitude and phase calibration device according to the present disclosure. As shown in FIG. 6, the device includes: a data selection module 62 and a plurality of basic units 64.

The data selection module 62 is configured to receive a plurality of signals to be calibrated, and route the plurality of signals to be calibrated to the plurality of basic units 64, and the plurality of signals to be calibrated are signals of one or more digital channels.

The plurality of basic units 64 are configured to perform amplitude and phase calibration on the plurality of signals to be calibrated, and each of the plurality of basic units 64 is configured to process one signal to be calibrated.

In an embodiment, each of the plurality of basic units 64 is configured to perform the amplitude and phase calibration on the signal to be calibrated according to a reference signal.

In an embodiment, each of the plurality of basic units 64 is further configured to process the signal to be calibrated and the reference signal to obtain a first signal; process the signal to be calibrated to obtain a second signal; determine an amplitude-phase tracking factor according to the first signal and the second signal; and perform the amplitude and phase calibration on the signal to be calibrated according to the amplitude-phase tracking factor.

In an embodiment, each of the plurality of basic units 64 is further configured to perform complex multiplication on the signal to be calibrated and the reference signal, and perform accumulation and averaging to obtain the first signal.

In an embodiment, each of the plurality of basic units 64 is further configured to square the signal to be calibrated, and perform accumulation and averaging to obtain the second signal.

In an embodiment, each of the plurality of basic units 64 is further configured to determine a ratio of the first signal to the second signal as the amplitude-phase tracking factor.

In an embodiment, each of the plurality of basic units 64 is further configured to perform complex multiplication on the signal to be calibrated and the amplitude-phase tracking factor to obtain a calibrated signal.

An embodiment of the present disclosure further provides a computer-readable storage medium having a computer program stored therein, and the computer program is configured to perform, when being executed, the operations according to any one of the method embodiments described above.

In an exemplary embodiment, the computer-readable storage medium may include, but is not limited to: any medium capable of storing a computer program, such as a Universal Serial Bus Flash Disk (a USB flash disk), a Read-Merely Memory (ROM), a Random Access Memory (RAM), a mobile hard disk, a magnetic disk, or an optical disc.

An embodiment of the present disclosure further provides an electronic device, including a memory having a computer program stored therein, and a processor configured to execute the computer program to perform the operations according to any one of the method embodiments described above.

In an exemplary embodiment, the electronic device may further include a transmission device connected to the processor, and an input/output device connected to the processor.

Reference may be made to the examples described in the above embodiments and the exemplary embodiments for specific examples of the present embodiment, and thus the specific examples of the present embodiment will not be described in detail here.

Apparently, it should be understood by those of ordinary skill in the art that all the modules or operations of the present disclosure described above may be implemented by a general-purpose computing device, may be integrated in a single computing device or distributed on a network composed of a plurality of computing devices, and may be implemented by program codes executable by a computing device, so that the modules or operations can be stored in a storage device and executed by the computing device. In some cases, the operations illustrated or described may be performed in an order different from that described herein. Or, the modules or operations may be separately made into integrated circuit modules, or some of the modules or operations may be made into a single integrated circuit module. Thus, the present disclosure is not limited to any specific combination of hardware and software.

The description above is merely of the desirable embodiments of the present disclosure, but is not intended to limit the present disclosure. Various modifications and changes may be made to the present disclosure by those of ordinary skill in the art. Any modification, equivalent replacement and improvement made within the principle of the present disclosure should be included in the scope of the present disclosure.

What is claimed is:

1. An amplitude and phase calibration method, comprising:

receiving a plurality of signals to be calibrated, wherein the plurality of signals to be calibrated are signals of one or more digital channels;

routing the plurality of signals to be calibrated to a plurality of basic units, wherein each of the basic units is configured to process one of the signals to be calibrated; and performing amplitude and phase calibration on the plurality of signals to be calibrated by the plurality of basic units, wherein performing the amplitude and phase calibration on the plurality of signals to be calibrated by the plurality of basic units comprises:

for each of the plurality of basic units, performing the amplitude and phase calibration on the one of the signals to be calibrated according to a reference signal, wherein performing the amplitude and phase calibration on the one of the signals to be calibrated according to the reference signal comprises:

processing the one of the signals to be calibrated and the reference signal to obtain a first signal;

processing the one of the signals to be calibrated to obtain a second signal;

determining an amplitude-phase tracking factor according to the first signal and the second signal; and performing the amplitude and phase calibration on the one of the signals to be calibrated according to the amplitude-phase tracking factor.

2. The method of claim 1, wherein processing the one of the signals to be calibrated and the reference signal to obtain the first signal comprises:

performing complex multiplication on the one of the signals to be calibrated and the reference signal, and performing accumulation and averaging to obtain the first signal.

3. The method of claim 1, wherein processing the one of the signals to be calibrated to obtain the second signal comprises:

squaring the one of the signals to be calibrated, and performing accumulation and averaging to obtain the second signal.

4. The method of claim 1, wherein determining the amplitude-phase tracking factor according to the first signal and the second signal comprises:

determining a ratio of the first signal to the second signal as the amplitude-phase tracking factor.

5. The method of claim 1, wherein performing the amplitude and phase calibration on the one of the signals to be calibrated according to the amplitude-phase tracking factor comprises:
  performing complex multiplication on the one of the signals to be calibrated and the amplitude-phase tracking factor to obtain a calibrated signal.

6. An amplitude and phase calibration device, comprising:
  a data selection module and a plurality of basic units, wherein the data selection module is configured to receive a plurality of signals to be calibrated, and route the plurality of signals to be calibrated to the plurality of basic units, wherein the plurality of signals to be calibrated are signals of one or more digital channels; and
  the plurality of basic units are configured to perform amplitude and phase calibration on the plurality of signals to be calibrated, wherein each of the plurality of basic units is configured to process one of the signals to be calibrated,
  wherein each of the plurality of basic units is configured to perform the amplitude and phase calibration on the one of the signals to be calibrated according to a reference signal,
  wherein each of the plurality of basic units is further configured to:
  process the one of the signals to be calibrated and the reference signal to obtain a first signal;
  process the one of the signals to be calibrated to obtain a second signal;
  determine an amplitude-phase tracking factor according to the first signal and the second signal; and
  perform the amplitude and phase calibration on the one of the signals to be calibrated according to the amplitude-phase tracking factor.

7. The device of claim 6, wherein each of the plurality of basic units is further configured to:
  perform complex multiplication on the one of the signals to be calibrated and the reference signal, and perform accumulation and averaging to obtain the first signal; and
  square the one of the signals to be calibrated, and perform accumulation and averaging to obtain the second signal.

8. The device of claim 6, wherein each of the plurality of basic units is further configured to:
  determine a ratio of the first signal to the second signal as the amplitude-phase tracking factor; and
  perform complex multiplication on the one of the signals to be calibrated and the amplitude-phase tracking factor to obtain a calibrated signal.

9. A non-transitory computer-readable storage medium having stored therein a computer program which is configured to perform, when being executed, the method of claim 1.

10. An electronic device, comprising a memory having a computer program stored therein, and a processor configured to execute the computer program to perform the amplitude and phase calibration method of claim 1.

11. The electronic device of claim 10, wherein the processor is configured to:
  perform complex multiplication on the one of the signals to be calibrated and the reference signal, and perform accumulation and averaging to obtain the first signal.

12. The electronic device of claim 10, wherein the processor is configured to:
  square the one of the signals to be calibrated, and perform accumulation and averaging to obtain the second signal.

13. The electronic device of claim 10, wherein the processor is configured to:
  determine a ratio of the first signal to the second signal as the amplitude-phase tracking factor.

14. The electronic device of claim 10, wherein the processor is configured to:
  perform complex multiplication on the one of the signals to be calibrated and the amplitude-phase tracking factor to obtain a calibrated signal.

* * * * *